United States Patent
Hirsch et al.

(10) Patent No.: US 11,996,791 B2
(45) Date of Patent: May 28, 2024

(54) METHOD AND DEVICE FOR CALIBRATING THE CONTROL OF AN ELECTRICAL MACHINE

(71) Applicant: Robert Bosch GmbH, Stuttgart (DE)

(72) Inventors: Michele Hirsch, Esslingen (DE); Yuping Chen, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 17/781,102

(22) PCT Filed: Oct. 21, 2020

(86) PCT No.: PCT/EP2020/079550
§ 371 (c)(1),
(2) Date: May 31, 2022

(87) PCT Pub. No.: WO2021/104753
PCT Pub. Date: Jun. 3, 2021

(65) Prior Publication Data
US 2023/0006587 A1    Jan. 5, 2023

(30) Foreign Application Priority Data

Nov. 29, 2019    (DE) ..................... 10 2019 218 532.0

(51) Int. Cl.
*H02P 21/22*        (2016.01)
*H02P 21/14*        (2016.01)

(52) U.S. Cl.
CPC .............. *H02P 21/22* (2016.02); *H02P 21/14* (2013.01)

(58) Field of Classification Search
CPC ........... H02P 21/22; H02P 21/14; H02P 21/00
See application file for complete search history.

(56) References Cited

U.S. PATENT DOCUMENTS

| | | | | |
|---|---|---|---|---|
| 2008/0111516 | A1* | 5/2008 | Inokuma | H02P 21/14 318/799 |
| 2013/0241454 | A1* | 9/2013 | Nemeth-Csoka | H02P 21/18 318/400.33 |

(Continued)

FOREIGN PATENT DOCUMENTS

| | | | | |
|---|---|---|---|---|
| CN | 110247602 A | * | 9/2019 | |
| DE | 102007003874 A1 | * | 2/2008 | .............. H02P 21/18 |

(Continued)

OTHER PUBLICATIONS

Translation of International Search Report for Application No. PCT/EP2020/079550 dated Jan. 11, 2021.

*Primary Examiner* — Bickey Dhakal

(74) *Attorney, Agent, or Firm* — Michael Best & Friedrich LLP

(57) ABSTRACT

The invention relates to a method (400) for calibrating the control of an electrical machine (120) for a specifiable torque value (T_Des), the electrical machine (120) being operated by means of field-oriented control. The method comprises the steps of: a.) specifying a current vector (Ix_V) (410) for producing the specifiable torque value (T_Des) by means of a connectable electrical machine (120), b.) specifying a test signal (Sx_Test) (420) and superimposing the test signal (Sx_Test) on the current vector (Ix_V), c.) capturing (430), by means of a sensor (130), a response signal (Sx_Antw) resulting from the superimposing, e.) determining (450) a calibrated current vector (I_Vk) according to the evaluation of the response signal (Sx_Antw).

11 Claims, 3 Drawing Sheets

(56) References Cited

U.S. PATENT DOCUMENTS

2014/0145655 A1     5/2014   Peretti et al.
2023/0006589 A1 *   1/2023   Hirsch .................... H02P 23/14

FOREIGN PATENT DOCUMENTS

DE     102007003874 A1       2/2008
DE     102016201746 A1       8/2017
DE     102018216881 A1 *     4/2020

* cited by examiner

METHOD AND DEVICE FOR CALIBRATING THE CONTROL OF AN ELECTRICAL MACHINE

BACKGROUND OF THE INVENTION

The invention relates to a method and a device for calibrating a control of an electrical machine for a specifiable torque value. Furthermore, the invention relates to an electrical drive system having a corresponding device and a vehicle having an electrical drive system as well as a computer program and a computer-readable storage medium.

Electrical rotating field machines, in particular permanent excitation synchronous machines having trenched magnets, are activated to generate a desired torque by means of a suitable combination of direct torque and reluctance torque. In field-oriented control, the direct torque and the reluctance torque are set by means of a corresponding selection of the d-current and q-current operating points (id, iq) in the rotor-fixed coordinate system. For current control in a field-oriented control (FOC), in particular in the base speed range, the associated current for a desired torque is ascertained from a locus curve, the so-called MTPC (maximum torque per current). These MTPC locus curves can be analytically determined, for example, under the assumption of an ideal machine having known inductances Ld and Lq. For real machines having saturation effects, a further approach is preferably to generate the MTPC locus curve numerically from simulation data (for example, finite element simulations). Further dependencies, for example temperature dependencies, internal electrical machine losses, spreads of material parameters and flows, appear in many cases to be the most viable way for an experimental determination of the MTPC locus curve on the test bench, preferably by way of example on a golden sample machine. Exemplar spreads, tolerances, etc. are neglected here. For example, a characteristic map of the torque over id/iq is sampled, currents and torques are measured, and the points for the shortest current pointer for desired torques are ascertained and suitably saved. This procedure is often complex and slow and therefore costly.

There is therefore a need for alternative methods and devices for calibrating a control of an electrical machine for a specifiable torque value.

SUMMARY OF THE INVENTION

A method is provided for calibrating a control, preferably a current control, of an electrical machine for a specifiable torque value. The electrical machine is operated using a field-oriented control. The method comprises the following steps:
a.) Specifying a current vector to generate the specifiable torque value by means of a connectable electrical machine. The current vector has a length and a direction as parameters.
b.) Specifying a test signal and superimposing the current vector with the test signal.
c.) Capturing a response signal resulting from the superposition, preferably the amplitude of the resulting response signal, by means of a sensor.
d.) Evaluating the response signal.
e.) Determining a calibrated current vector as a function of the evaluation of the response signal.
f.) Operating the control of the electrical machine for the specifiable torque value by means of specifying the calibrated current vector.

The operation of electrical machines by means of field-oriented controls is known. The alternating variables of the phase currents are each transferred into a coordinate system rotating at the frequency of the alternating variables. Within the rotating coordinate system, zero-frequency variables, to which all typical methods of control technology can be applied, then result from the alternating variables in stationary operation of the electrical machine. Due to the multiphase phase-offset in alternating currents applied in the stator, a rotating magnetic field, consisting of a stator flux and a rotor flux, results during operation of the electrical machine. The control of the electrical machine specifies a stator current as a function of a specifiable torque value. Within the rotating coordinate system, the d/q coordinate system, which rotates synchronously with the rotor flux and the d axis of which points in the direction of the rotor flux, a stator current is represented as a stator current pointer or stator current vector, which is characterized via its length and its direction. This current pointer rotates synchronously with the rotating stator flux or rotor flux of the electrical machine. In the d/q coordinate system, the current pointer can be represented in accordance with its length and its direction by means of two components Id and Iq perpendicular to one another, which are zero-frequency variables in the stationary case. Machine-specific lines can be represented in this coordinate system, along which the electrical machine emits a constant torque, so-called iso-torque lines. A control of an electrical machine can access desired operating points on these iso-torque lines by means of characteristic maps, wherein these parameters can change due to above-mentioned dependencies for each machine (exemplary spreads), the rotor temperature, and over the runtime of the machine and are thus to be calibrated. For current vectors of equal length, there is only one very specific direction, in which the maximum torque is generated by a connected electrical machine. In one step of the method, a current vector is specified to generate a specifiable torque value. To check whether it is the correct direction to generate the maximum torque, a test signal is specified and superimposed on the current vector. This superposition results in an oscillation of the emitted torque in a connected electrical machine. This oscillation in the torque results, due to the mechanical coupling of the electrical machine with the housing, in a mechanical and/or acoustic oscillation of the housing and components connected thereto. The mechanical transmission behavior of the mechanical system results in a noise excitation of a connected electrical machine and/or of the power electronics, which is measurable using a suitable sensor, for example, acoustically. The torque oscillation or oscillations resulting therefrom are captured as a response signal from the superposition of the current vector and the test signal by means of a sensor. This response signal is evaluated and the calibrated current vector, preferably the direction of the calibrated current vector, is determined as a function of the evaluation of the response signal. The parameter of the direction of a current vector to emit a specifiable torque value is thus calibrated and stored in a characteristic map. Subsequently, the control of the electrical machine is operated for the specifiable torque value by means of specifying the calibrated current vector.

Advantageously, a method is provided for calibrating a control, preferably a current control, of an electrical machine for a specifiable torque value. The method is preferably provided for an integrated electrical axle, consisting of the rotary field machine and a power electronics unit, which is mechanically attached to the machine, preferably coupled mechanically strongly or fixedly, or is integrated. The method enables the method to be carried out for each individual electrical machine. It can be carried out both at the end of the production line and/or during the lifetime of the electrical drive as desired, also during a regular driving mode. A drive component (for example, an e-axle) preferably comprises the sensor and the method. A possibility is provided of having the method run during startup, a check at the belt end, or in the driving mode. The calibration parameters can thus be determined and readjusted or relearned specifically by exemplar, dependent on temperature, and/or dependent on aging. A method is provided which provides a self-learning self-calibrating control for an electrical drive. A self-calibration for the MTPC locus curve is enabled, which runs independently of a test bench and an external measurement sensor system.

In another embodiment of the invention, the test signal has a length and a direction, wherein the direction is aligned orthogonally to the current vector, the test signal oscillates on both sides of the current vector and is preferably vectorially added to the current vector.

The test signal has a length and a direction in accordance with the predefined current vector as parameters. The superposition takes place vectorially. In the rotating coordinate system, a vectorial addition of the current vector and the test signal results. The test signal is aligned orthogonally to the current vector and oscillates, preferably at a specifiable frequency. Due to the oscillation of the test signal, a connected electrical machine generates a different torque, in particular of the harmonically oscillating component, depending on the present length and direction of the test signal. Two distinctive response signal types result. The amplitude of the oscillation of the torque becomes greater the greater the deviation of the direction of the specified current vector from the maximum torque achievable with its length. The oscillation of the torque and the test signal have a common phasing and frequency in this case. The amplitude of the oscillation of the torque becomes less the lower the deviation of the direction of the specified torque vector is from the maximum torque achievable with its length. The oscillation of the torque contains a frequency component at double the frequency of the test signal precisely when the direction of the current vector is in the very close vicinity of that which is associated with the torque achievable with this length. This double-frequency current occurs because due to the typical curvature of the iso-torque lines, an oscillation in the tangential direction of the iso-torque line to the right and left of the output current vector results in a minimum of the torque, the double frequency. The minimized oscillation of the torque or the disappearing torque ripple or also the occurrence of the double frequency can be acoustically detected using suitable frequencies of the harmonics, thus when the corresponding frequency disappears or appears in the measured noise. Particularly suitable frequencies of the oscillation of the test signal are to be selected as those at which the connected machine has no or only minor intrinsic electromagnetic excitations, this could be, for example, for a 3-phase electrical machine, preferably the 5 or 7 order in the torque, since intrinsic excitations are expected here, for example, at the 6 and 12 order. An advantageous excitation order with respect to the said electrical frequency for this method is preferably selected so that at this order without specified test signal, no or hardly any intrinsic electromagnetic orders are generated in the oscillation of the torque. The response signal to be expected would thus be solely coupled to the method and the disappearing response signal can be used as a target variable.

Furthermore, preferably in the selection of the excitation frequency or order, preferably a frequency/order is to be selected which is detectable well by the sensor, which relates to the sensor sensitivity and above all the transmission behavior of this frequency of a torque ripple on the sensor.

A possible test signal is advantageously provided which enables a judgment of the direction of the specified current vector with respect to the achievable maximum torque.

In another embodiment of the invention, steps a.) to d.) are repeated at least twice, wherein the direction of the current vector is specified changed in each case by a specifiable absolute value. In the evaluation of the response signals according to step d.), the captured response signals are compared. A gradient or a minimum of the captured response signals is ascertained.

The specification of the current vector and the test signal are repeated at least two times using different directions of the current vector. The response signals are evaluated in that the response signals, preferably the amplitudes of the response signals, are compared. Preferably, it is derived on the basis of the dimension and the change of the amplitude, preferably as a function of the gradient and/or the minimum of the response signal, whether the specified current vector generates the maximum torque in a connected electrical machine or in which direction the current vector has to be changed upon further repetitions in order to further approximate the direction in which a connected electrical machine generates the maximum torque. With greater length or a greater absolute value of the test signal, the amplitude of the resulting oscillation of the torque increases. Therefore, the length of the test signal is to be reduced at excessively large amplitudes.

A method for iterative approximation to the direction of the current vector, at which a connected electrical machine generates the maximum torque, is advantageously provided.

In another embodiment of the invention, the direction of the current vector is specified in each case upon the repetition of the steps by a specifiable absolute value, preferably new in each iteration step, in the positive and negative directions of the last specified current vector or in each case in positive or negative direction of the last specified current vector. The repetition of the steps is preferably executed until the gradient between the preferably approximately last three response signals falls below a first specifiable limiting value or the response signal falls below a second specifiable limiting value.

Advantageously, different variants are provided for the iterative approximation to the direction of the current vector, at which a connected electrical machine generates the maximum torque.

In another embodiment of the invention, according to step e.), the calibrated current vector is specified in that the parameter of the specified current vector, the captured response signal of which is minimal, is specified for the calibrated current vector.

When the direction of the current vector is reached at which a connected electrical machine would generate the maximum torque, a minimal response signal thus results, preferably a minimal amplitude of the response signal. The parameters then provided of the current vector, the length of the vector, and the direction of the vector are specified as parameters for the calibrated current vector.

A method for determining the calibrated current vector is advantageously specified.

Furthermore, the invention relates to a computer program which comprises commands which, upon the execution by a computer, cause it to carry out the steps of the above-described method.

Furthermore, the invention relates to a computer-readable storage medium, comprising commands which, upon the execution by a computer, cause it to carry out the steps of the above-described method.

Furthermore, the invention relates to a device for calibrating a control of an electrical machine. The device comprises a sensor, preferably a mechanical sensor. Furthermore, the device comprises a circuit carrier, wherein the circuit carrier has a test signal generator and a computing unit. The device is configured to carry out the steps of the described method.

A device for calibrating a control of an electrical machine is advantageously provided. This device comprises a sensor, preferably a mechanical sensor, for capturing the response signal resulting from the superposition of the current vector and the test sensor. The device furthermore comprises a test signal generator to specify the test signal and a computing unit to carry out the described method.

In another embodiment of the invention, the sensor is mechanically fixedly or essentially rigidly connected to the electrical machine. Alternatively, the sensor is fixedly attached to the circuit carrier and the circuit carrier is fixedly integrated on or in the electrical machine.

For a high resolution and undisturbed capture of the response signal, a connection to the electrical machine which is mechanically fixed or is via a circuit carrier, which is attached on or in the electrical machine, is provided. Alternatively, of course, it can also be carried out using a sensor outside the device or power electronics, for example, a microphone on or adjacent to the electrical machine or also by means of a structure-borne sound sensor, for example, embodied as an acceleration sensor installed on a surface, preferably of the electrical machine or a control unit or inverter.

A position for fastening the sensor for a good signal transfer is advantageously provided.

In another embodiment of the invention, the mechanical sensor is a microphone, an acceleration sensor or a structure-borne sound sensor or a speed sensor.

Sensors are advantageously provided which are provided to capture the response signal which results from the oscillation of the torque. The oscillations of the torque can be captured acoustically, by means of acceleration measurement, preferably on a mechanically fixed unit with the electrical machine, or by means of structure-borne sound. A speed change of the electrical machine also results from the oscillations of the torque, so that it is also possible to capture the response signals by means of a speed sensor.

Furthermore, the invention relates to an electrical drive system having an electrical machine and a described device. Such an electrical drive system is used, for example, to drive an electrical vehicle. A reasonably controlled operation of the drivetrain is enabled by means of the method and the device.

Furthermore, the invention relates to a vehicle having a described drive system. A vehicle is thus advantageously provided which comprises a device using which a control of an electrical machine can be calibrated.

It is obvious that the features, properties, and advantages of the method according to the invention apply or are applicable accordingly to the device or the drive system and the vehicle and vice versa.

BRIEF DESCRIPTION OF THE DRAWINGS

Further features and advantages of embodiments of the invention result from the following description with reference to the appended drawings.

The invention is explained in more detail hereinafter on the basis of several figures, in the figures.

DETAILED DESCRIPTION

Figure 1:
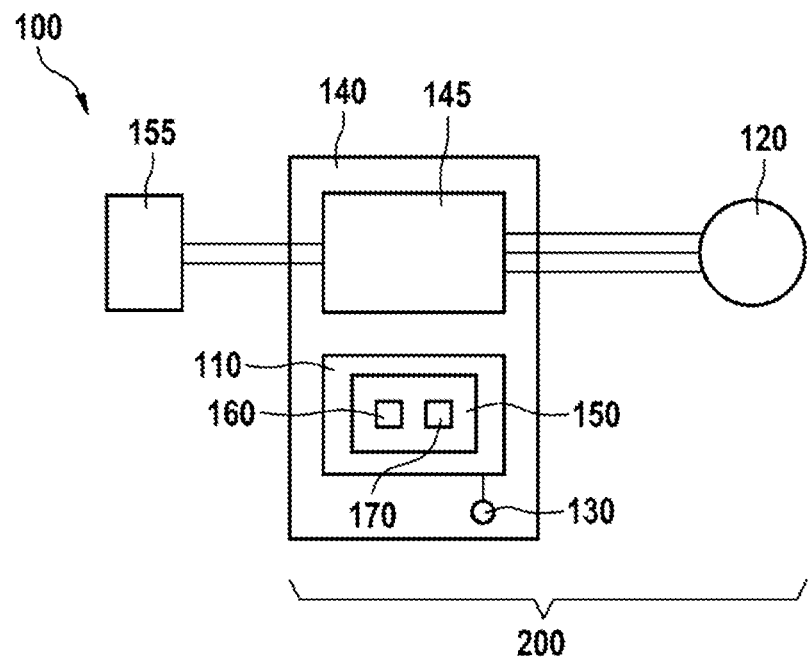
FIG. 1 shows a schematic representation of a device for calibrating a control of an electrical machine.

FIG. 1 shows a device 100 for calibrating a control 110 of an electrical machine 120. The device comprises a sensor 130, preferably a mechanical sensor having a mechanically rigid or fixed direct or indirect connection to the electrical machine 120. Furthermore, the device comprises a circuit carrier 150, wherein the circuit carrier has a test signal generator 160 and a computing unit 170. The control 110 is preferably integrated in an inverter 140, wherein the inverter comprises a power electronics unit 145, preferably a B6 bridge, for supplying the connectable machine 120 from a battery 155. Furthermore, the electrical drive system 200 having the device 100 and the electrical machine 120 is shown in FIG. 1.

Figure 2:
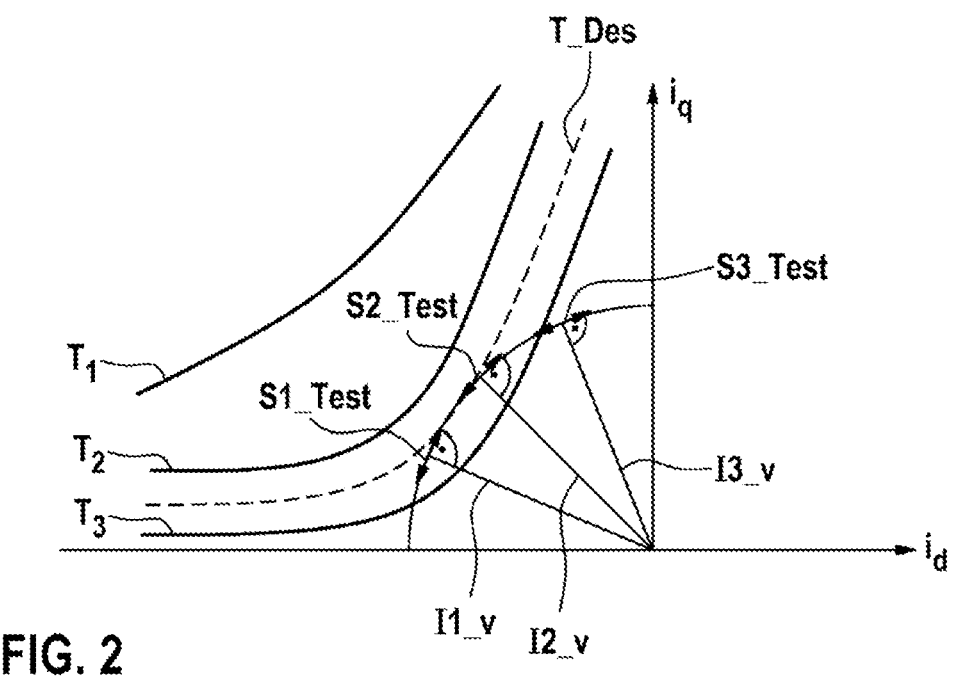
FIG. 2 shows a diagram of the dq current plane with plotted iso-torque lines for application of a field-oriented control.

FIG. 2 shows a diagram of the dq current plane with plotted iso-torque lines for application of a field-oriented control. Zero-frequency variables result within the rotating coordinate system in stationary operation of the electrical machine from the alternating variables, for example, the phase currents. In the d/q coordinate system, which rotates synchronously with the rotor flux and the d axis of which points in the direction of the rotor flux, a stator current is represented as the current vector Ix_v, which is characterized via its absolute value or its length l_s and its direction Ix_a. This current vector Ix_v rotates synchronously with the rotating stator flux and rotor flux of the electrical machine. In this coordinate system, machine-specific lines T1, T2, T3, T_Des can be represented, along which the electrical machine emits a constant torque. A control of an electrical machine can access the parameters of these lines by means of characteristic maps or data which can be parameterized. By means of variation of the direction Ix_a of the current vector, and thus different id and iq components, the different operating points can be set on these lines. Three current vectors having equal length Is are represented by I1_v, I2_v, and I3_v, the directions Ix_a of which each differ by a specifiable absolute value Ix_a_Delta. The specifiable test signals S1_Test, S2_Test, S3_Test are shown orthogonally to these current vectors. It can be seen from the diagram that the oscillating test signals S1_Test and S3_Test intersect more iso-torque lines than the test signal S2_Test. Therefore, greater torque variations result from the superposition of the current vectors and the test signals S1_Test and S3_Test than upon the superposition of the current vector I2_v and the test signal S2_Test with a connected electrical machine. Correspondingly, in this example the parameters, preferably the direction, of the current vector I2_v is assumed for the calibrated current vector I_Vk.

Figure 3:
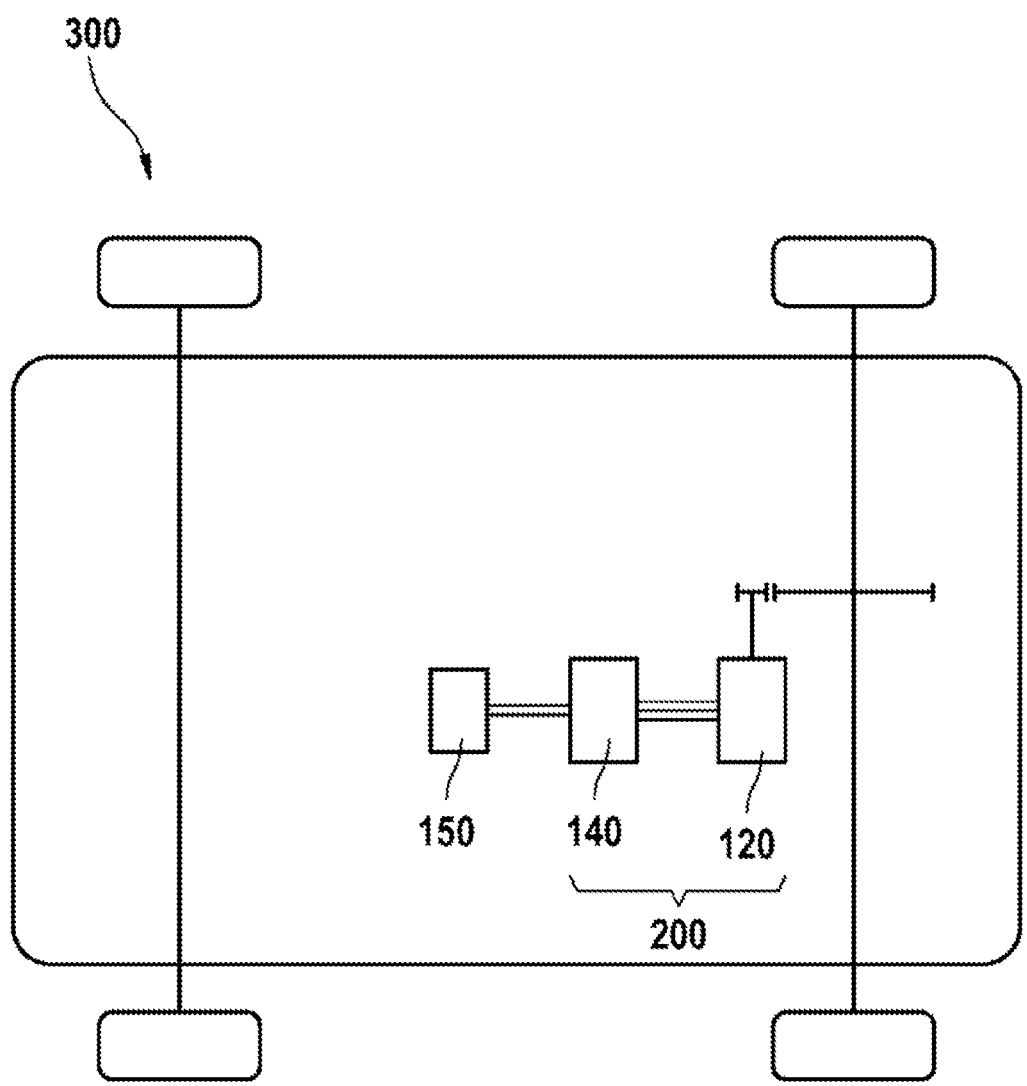
FIG. 3 shows a schematically illustrated vehicle having a drivetrain.

FIG. 3 shows a schematically illustrated vehicle 300 having an electrical drive system 200. The drive system 200 comprises the device 100 for calibrating the control 110 of the electrical machine 120 in the inverter 140 and the electrical machine 210. The electrical drive system preferably comprises the battery 150.

Figure 4:
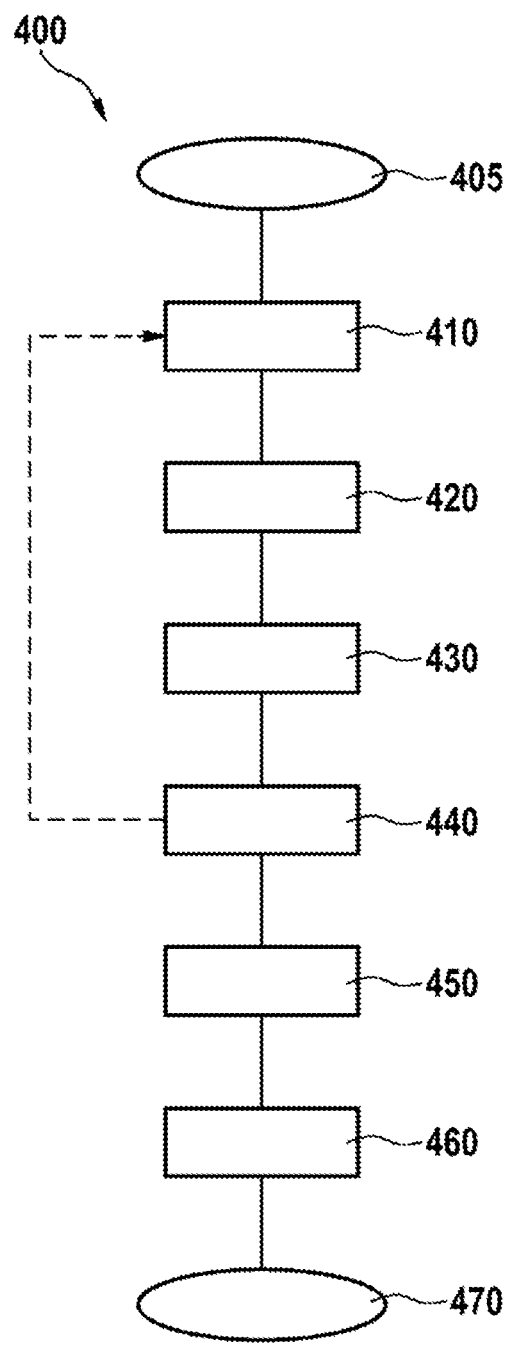
FIG. 4 shows a schematically illustrated flow chart for a method for calibrating an offset angle of a field-oriented control of an electrical machine.

FIG. 4 shows a schematic sequence of a method 400 for calibrating a control of an electrical machine 120 for a specifiable torque value T_Des. The method starts with step 405. The electrical machine 120 is operated using a field-oriented control. The method comprises the following steps:
- a.) specifying a current vector Ix_v, 410 to generate the specifiable torque value T_Des by means of a connectable electrical machine 120, wherein the current vector Ix_v has a length l_s and a direction Ix_a as parameters,
- b.) specifying a test signal Sx_Test, 420 and superimposing the current vector Ix_v with the test signal Sx_Test,
- c.) capturing 430 a response signal Sx_Antw resulting from the superposition by means of a sensor 130,
- d.) evaluating 440 the response signal Sx_Antw,
- e.) determining 450 a calibrated current vector I_Vk as a function of the evaluation of the response signal Sx_Antw,
- f.) operating 460 the control of the electrical machine 120 for the specifiable torque value T_Des by means of specifying the calibrated current vector I_Vk. Steps a.) to d.) 410-440 are preferably repeated at least twice for the iterative approximation to the direction of the current vector Ix_v, at which a connected electrical machine 120 generates the maximum torque. The method ends with step 470.

The invention claimed is:

1. A method (400) for calibrating a control of an electrical machine (120) for a specifiable torque value (T_Des), wherein the electrical machine (120) is operated using a field-oriented control, the method comprising the following steps:
- a.) specifying a current vector (Ix_v) (410) to generate the specifiable torque value (T_Des) by means of a connectable electrical machine (120),
wherein the current vector (Ix_v) has a length (l_s) and a direction (Ix_a) as parameters,
- b.) specifying a test signal (Sx_Test) (420) and superimposing the current vector (Ix_v) with the test signal (Sx_Test),
- c.) capturing (430) a response signal (Sx_Antw) resulting from the superposition by means of a sensor (130),
- d.) evaluating (440) the response signal (Sx_Antw),
- e.) determining (450) a direction of a calibrated current vector (I_Vk) to generate the specifiable torque value (T_Des) as a function of the evaluation of the response signal (Sx_Antw), and
- f.) operating (460) the control of the electrical machine (120) for the specifiable torque value (T_Des) by means of specifying the calibrated current vector (I_Vk).

2. The method as claimed in claim 1, wherein the test signal (Sx_Test) has a length (S s) and a direction (Sx_a), wherein the direction (Sx_a) is aligned orthogonally to the current vector (Ix_V), and the test signal (Sx_Test) oscillates on both sides of the current vector (Ix_V).

3. The method as claimed in claim 1,
wherein steps a.) to d.) are repeated at least twice,
wherein the direction (Ix_a) of the current vector (Ix_V) is specified changed in each case by a specifiable absolute value (Ix_a_Delta),
wherein upon the evaluation of the response signals (Sx_Antw) according to step d.), the captured response signals (Sx_Antw) are compared, and
a gradient or a minimum of the captured response signals (Sx_Antw) is ascertained.

4. The method as claimed in claim 3, wherein the direction (Ix_a) of the current vector (Ix_V) is specified in each case by a predefinable absolute value (Ix_a_Delta) in the positive and negative direction of the last specified current vector (Ix_V) or is specified in each case in the positive or negative direction of the last specified current vector (Ix_V).

5. The method as claimed in claim 4, wherein according to step e.), the calibrated current vector (I_Vk) is specified in that the parameters of the specified current vector (Ix_V), the captured response signal (Sx_Antw) of which is minimal, are specified for the calibrated current vector (I_Vk).

6. A non-transitory, computer-readable medium containing instructions that when executed by a computer cause the computer to control of an electrical machine (120) for a specifiable torque value (T_Des), wherein the electrical machine (120) is operated using a field-oriented control, by:
- a.) specifying a current vector (Ix_v) (410) to generate the specifiable torque value (T_Des) by means of a connectable electrical machine (120), wherein the current vector (Ix_v) has a length (l_s) and a direction (Ix_a) as parameters,
- b.) specifying a test signal (Sx_Test) (420) and superimposing the current vector (Ix_v) with the test signal (Sx_Test),
- c.) capturing (430) a response signal (Sx_Antw) resulting from the superposition by means of a sensor (130),
- d.) evaluating (440) the response signal (Sx_Antw),
- e.) determining (450) a direction of a calibrated current vector (I_Vk) to generate the specifiable torque value (T_Des) as a function of the evaluation of the response signal (Sx_Antw), and
- f.) operating (460) the control of the electrical machine (120) for the specifiable torque value (T_Des) by means of specifying the calibrated current vector (I_Vk).

7. A device (100) for calibrating a control (110) of an electrical machine (120),
having a sensor (130),
having a circuit carrier (150),
wherein the circuit carrier has a test signal generator (160) and a computing unit (170),
wherein the device is configured to
- a.) specify a current vector (Ix_v) (410) to generate the specifiable torque value (T_Des) by means of a connectable electrical machine (120),
wherein the current vector (Ix_v) has a length (l_s) and a direction (Ix_a) as parameters,
- b.) specify a test signal (Sx_Test) (420) and superimposing the current vector (Ix_v) with the test signal (Sx_Test),
- c.) capture (430) a response signal (Sx_Antw) resulting from the superposition by means of the sensor (130),
- d.) evaluate (440) the response signal (Sx_Antw),
- e.) determine (450) a direction of a calibrated current vector (I_Vk) to generate the specifiable torque value (T_Des) as a function of the evaluation of the response signal (Sx_Antw), and
- f.) operate (460) the control of the electrical machine (120) for the specifiable torque value (T_Des) by means of specifying the calibrated current vector (I_Vk).

8. The device as claimed in claim 7, wherein the sensor (130) is mechanically fixedly connected to the electrical machine (120) or the sensor (130) is fixedly attached to the circuit carrier (150) and the circuit carrier (150) is fixedly integrated in or on the electrical machine (120).

9. The device as claimed in claim 8, wherein the sensor (130) is a microphone, an acceleration sensor or structure-borne sound sensor or a speed sensor.

10. An electrical drive system (200) having the electrical machine (120) and the device (100) as claimed in claim 7.

11. A vehicle (300) having the electrical drive system (200) as claimed in claim 10.

* * * * *